(12) United States Patent
Coudry (10) Patent No.: US 12,553,204 B2
(45) Date of Patent: Feb. 17, 2026

(54) REINFORCEMENT ELEMENT FOR A DIAPHRAGM WALL PROVIDED WITH A SEAL-CARRIER

(71) Applicant: SOLETANCHE FREYSSINET, Rueil Malmaison (FR)

(72) Inventor: Michel Coudry, Rueil Malmaison (FR)

( * ) Notice: Subject to any disclaimer, the term of this patent is extended or adjusted under 35 U.S.C. 154(b) by 69 days.

(21) Appl. No.: 17/927,916

(22) PCT Filed: May 24, 2021

(86) PCT No.: PCT/EP2021/063739
§ 371 (c)(1),
(2) Date: Nov. 28, 2022

(87) PCT Pub. No.: WO2021/239644
PCT Pub. Date: Dec. 2, 2021

(65) Prior Publication Data
US 2023/0203772 A1    Jun. 29, 2023

(30) Foreign Application Priority Data
May 29, 2020   (FR) ...................................... 2005694

(51) Int. Cl.
    *E02D 5/20*    (2006.01)
(52) U.S. Cl.
    CPC ........ *E02D 5/20* (2013.01); *E02D 2250/0023* (2013.01); *E02D 2300/002* (2013.01); *E02D 2300/0034* (2013.01); *E02D 2600/20* (2013.01)
(58) Field of Classification Search
    CPC .. E02D 5/16; E02D 5/06; E02D 29/02; E02D 5/10; E02D 5/20
    See application file for complete search history.

(56) References Cited

U.S. PATENT DOCUMENTS

| 3,431,736 A | 3/1969 | Ueda |
| 4,005,582 A | 2/1977 | Tamaro |

FOREIGN PATENT DOCUMENTS

| AU | 510165 B2 | 6/1980 |
| CH | 556956 | * 12/1974 |
| CN | 101608447 A | 12/2009 |
| CN | 111155530 A | 5/2020 |
| EP | 0101350 A | 2/1984 |
| FR | 3009566 | * 2/2015 |

OTHER PUBLICATIONS

English asbtract of CN101608447.
English asbtract of CN111155530.
English asbtract of EP0101350.

* cited by examiner

*Primary Examiner* — Sean D Andrish

(57) ABSTRACT

A reinforcement element for a diaphragm wall is described. The reinforcement element includes a reinforcement cage, the reinforcement element further includes a seal-carrier provided with a mounting part for receiving at least one seal, which is elongated, the seal-carrier is fixed to the first end part of the reinforcement cage and extends along the longitudinal direction of the reinforcement cage, the seal-carrier defines a housing for receiving the seal, at least a first part of which is surrounded by a sacrificial material. Additionally, a method for making a diaphragm wall in the ground is described that comprises placing the reinforcement element in a first trench, pouring concrete into the first trench, and discharging the sacrificial material out of the housing using a scraping tool.

10 Claims, 11 Drawing Sheets

REINFORCEMENT ELEMENT FOR A DIAPHRAGM WALL PROVIDED WITH A SEAL-CARRIER

TECHNICAL FIELD

The disclosure relates to the field of the manufacture of diaphragm walls in the ground. It particularly relates to the techniques of joining two adjacent panels of the diaphragm wall.

BACKGROUND

In known manner, a diaphragm wall includes a plurality of adjacent panels, connected one after the other. To ensure continuity and sealing between two adjacent panels, it is important that the junction between the panels is correctly made.

To do so, several techniques are traditionally used.

According to a first technique, after having made a first concrete panel, the first panel is overlapped so that the concrete of the second panel comes into contact with the concrete of the first panel in order to ensure the continuity of concrete between the two panels.

A second technique includes using a generally metallic formwork which is temporarily inserted into the trench and removed after hardening of the concrete. This formwork allows the installation of a seal which extends vertically along the end edge of the panel. Such a technique is in particular described in EP 0 101 350. The use of a formwork makes the second technique more expensive and time-consuming than the first technique.

SUMMARY

One aim of the present disclosure is to allow making a junction between two adjacent panels without using a formwork.

To do so, the disclosure relates to a reinforcement element for a diaphragm wall including a reinforcement cage which has a length defining a longitudinal direction, a width and a thickness, the reinforcement cage having a first end part and a second end part opposite to the first end part, the first and second end parts extending along the longitudinal direction of the reinforcement cage, the reinforcement element further including at least one seal-carrier provided with a mounting part for receiving at least one seal which is elongated, the seal-carrier being fixed to the first end part of the reinforcement cage and extending along the longitudinal direction of the reinforcement cage, the seal-carrier having two flanges extending along the longitudinal direction and a bottom so as to define a housing for receiving the seal, at least a first part of which is surrounded by a sacrificial material.

The reinforcement element according to the disclosure therefore allows both reinforcing the concrete constituting the panel, and placing and fixing the seal along the first vertical edge of the panel, and this without using a formwork element.

It is understood that the reinforcement element according to the disclosure is placed in a first trench before the pouring of the concrete.

Once the concrete of the first panel has hardened, the second trench is drilled and then the sacrificial material is removed so as to release the first part of the seal, the second part of the seal being engaged in the concrete of the first panel.

This first part of the seal will then be embedded in the concrete during the pouring of concrete into the second trench. In other words, the first part will be engaged in the concrete of the second panel adjacent to the first panel, so as to achieve the sealing between the first and second panels.

It is understood that the seal is intended to be disposed in the housing. Without departing from the scope of the present disclosure, the seal-carrier can receive several seals disposed side by side.

In known manner, the reinforcement cage includes a plurality of reinforcement rods, so as to make reinforced concrete.

The flanges of the housing flank the sacrificial material, with the aim of protecting it, in particular during the introduction of the reinforcement element into the trench.

Preferably, the distance between the flanges is smaller than the width of the reinforcement cage, more preferably, this distance is smaller than half the width of the reinforcement cage.

Preferably, the flanges are parallel.

Preferably, but not exclusively, the seal is fixed to the bottom of the housing.

The seal-carrier is preferably a longitudinal profile. It extends along the height of the reinforcement cage.

Again preferably, the longitudinal profile has a "U" section.

According to one preferred embodiment, the longitudinal profile includes two "L"-shaped longitudinal elements. Preferably, the two "L"-shaped longitudinal elements are spaced apart from each other in order to form a slot into which the seal is inserted.

Advantageously, the longitudinal profile is fixed, for example by welding, to the reinforcement cage, preferably at its first end part.

Without departing from the scope of the present disclosure, the seal-carrier can be mounted at least partly in the volume of the reinforcement cage. In other words, the seal-carrier can be in a recess of the reinforcement cage.

Advantageously, the mounting part includes a longitudinal slot formed in the bottom to receive the seal.

According to one embodiment, the seal has a length which is greater than the length of the longitudinal slot of a reinforcement element. In other words, the length of the seal is greater than the length of the seal-carrier. In this case, the seal is successively engaged in the slots of the seal-carriers of several reinforcement elements disposed vertically one above the other in the trench. Such a mounting allows ensuring the vertical continuity of the sealing.

Advantageously, the reinforcement element further includes at least one reinforcing member connecting at least one of the flanges to the reinforcement cage. The reinforcing members have the effect of increasing the robustness of the fixing of the seal-carrier to the reinforcement cage.

According to one preferred embodiment, the reinforcement cage, considered in a plane perpendicular to the longitudinal direction, includes two adjacent reinforcement portions each provided with at least two parallel reinforcements, the seal-carrier being fixed to each of the two adjacent reinforcement portions. According to one variant, the seal-carrier is disposed between the two adjacent reinforcement portions. The two adjacent reinforcement portions are also fixed to each other via separate means for fixing the seal-carrier.

The disclosure further relates to a reinforcement device including a reinforcement element according to the disclosure, as well as at least one seal and a sacrificial material in the housing, the seal being mounted on the seal-carrier while being at least partly bordered by the sacrificial material.

Preferably, the sacrificial material is disposed in the housing, on either side of the seal. More specifically, the sacrificial material is disposed on either side of the first part of the seal which is located in the housing. More preferably, the sacrificial material substantially fills the volume of the housing. One interest is to prevent the concrete from adhering to the first part of the seal which is located in the housing.

Considered in a plane perpendicular to the longitudinal direction, and parallel to the thickness of the reinforcement cage, the span, that is to say the maximum thickness of the sacrificial material, is smaller than the thickness of the reinforcement cage.

According to one advantageous embodiment, the seal further has a second part, the first and second parts being disposed on either side of the bottom when the seal is mounted on the seal-carrier, so that the seal extends transversely on either side of the bottom, the first part being located in the housing and flanked by the sacrificial material.

Preferably, the first part of the seal is located entirely within the volume of the housing.

According to one embodiment, the sacrificial material is a friable material. It preferably includes polystyrene.

The disclosure further relates to a scraping tool for discharging the sacrificial material disposed in a housing of a reinforcement device according to the disclosure, the scraping tool including two parallel teeth spaced apart from each other so as to define a passage for the seal. Preferably, the width of the scraping tool being substantially equal to the distance between the flanges of the seal-carrier. The teeth are engaged in the housing, on either side of the first part of the seal.

To remove the sacrificial material, the scraping tool is placed in the housing while engaging the first part of the seal in the passage between the two teeth of the scraping tool. During the vertical displacement of the scraping tool along the longitudinal direction, the vertical displacement of the teeth has the effect of discharging the sacrificial material out of the housing. Preferably, the teeth have an inclined face relative to the bottom so as to facilitate the release of the sacrificial material.

The disclosure finally relates to a method for making a diaphragm wall in the ground in which a first vertical trench is drilled in the ground, a first reinforcement device according to the disclosure is placed in the first trench, concrete is poured into the first trench then, after hardening of the concrete, a second vertical trench is drilled in the ground, juxtaposed with the first trench on the side of the seal-carrier, the sacrificial material is discharged out of the housing using the scraping tool according to the disclosure, so that the first part of the seal extends into the second trench, then concrete is put in the second trench.

It is understood that, after hardening of the concrete put in the first trench, the first panel which includes the reinforcement element is obtained. The second part of the seal is engaged with the concrete of the first panel. After discharging the sacrificial material out of the housing, the first part of the seal is uncovered. The housing then opens onto the second trench. When putting the concrete in the second trench, it is poured into the housing so that the first part of the seal engages with the concrete of the second trench.

Preferably, the first panel can if necessary be overlapped during the drilling of the second adjacent trench, in order to clear the ground located between the second trench and the housing.

DESCRIPTION OF THE DRAWINGS

The disclosure will be better understood upon reading the following description of embodiments of the disclosure given by way of non-limiting examples, with reference to the appended drawings, in which:

FIG. 11 illustrates a fifth step of the method for making a diaphragm wall according to the disclosure;

DETAILED DESCRIPTION

Figure 1:
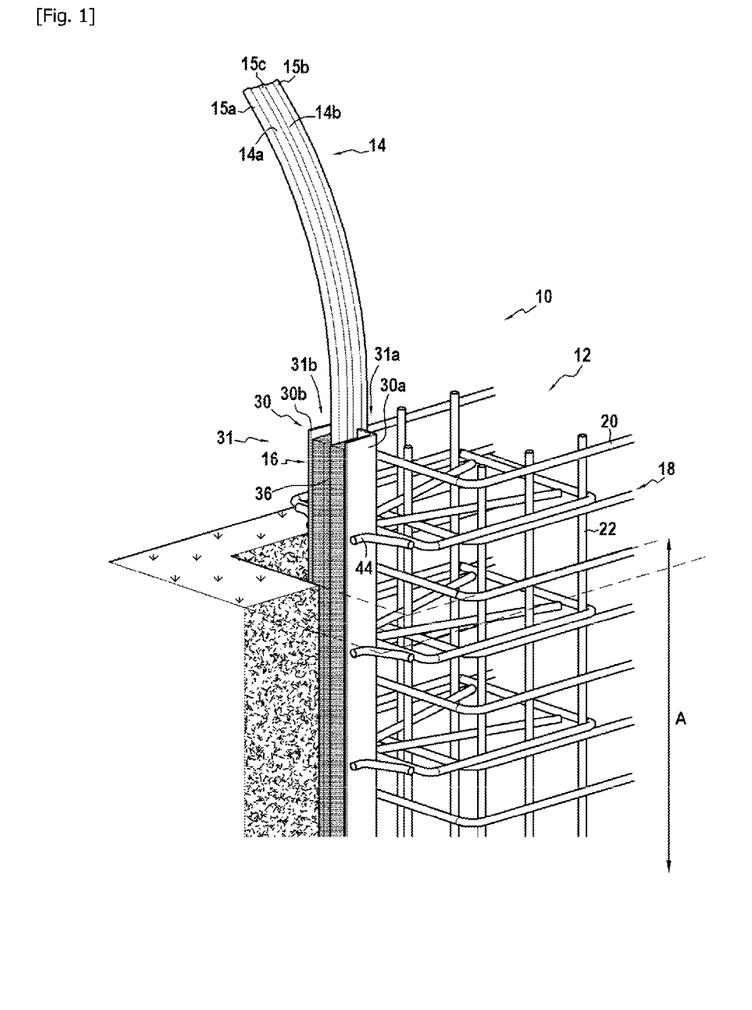
FIG. 1 is a schematic perspective view of one exemplary embodiment of a reinforcement device in accordance with the present disclosure, including a reinforcement element according to the disclosure, as well as a seal and a sacrificial material.

A first exemplary embodiment of a reinforcement device 10 in accordance with the present disclosure will be described using FIGS. 1 and 2.

This reinforcement device includes a reinforcement element 12 for a diaphragm wall in accordance with the disclosure, as well as a seal 14 and a sacrificial material 16 which will be described in more detail below.

The reinforcement element 12 includes a reinforcement cage 18 which includes a plurality of horizontal 20 and vertical 22 bars which are fixed to each other, for example by welding, in a manner known otherwise.

The reinforcement cage 18 has a length L defining a longitudinal direction, which is generally vertical. This length can also be considered as being the height of the reinforcement cage. The reinforcement cage 18 also has a width I and a thickness e visible in FIG. 2.

The reinforcement cage 18, considered according to its width, has a first end part 18a and a second end part 18b opposite to the first end part 18a.

The first and second end parts 18a, 18b extend vertically along the longitudinal direction A of the reinforcement cage.

In this example, the seal 14 is longer than the length of the reinforcement cage.

The reinforcement element 18 further includes a seal-carrier 30 located at the first end part 18a of the reinforcement element 18. The seal-carrier 30 is adapted to receive the seal 14. Without departing from the scope of the disclosure, the seal-carrier 30 could receive several seals disposed side by side. As observed in FIGS. 1 and 2, the seal-carrier 30 is fixed to the first end part 18a of the reinforcement cage 18. The seal-carrier 30 moreover extends along the longitudinal direction A of the reinforcement cage. The seal-carrier 30 includes two flanges 30a, 30b separated by a distance d.

Preferably, the two flanges are parallel and extend along the longitudinal direction A. When they are parallel, this facilitates the guiding of the scraping tool which will be described below.

Considered according to the width of the reinforcement cage, the distance d between the flanges of the seal-carrier is smaller than the thickness of the reinforcement cage, and more specifically smaller than half the thickness e of the reinforcement cage 18.

The seal-carrier 30 further includes a bottom 34 which, in this example, is perpendicular to the flanges 30a, 30b. The bottom also extends along the longitudinal direction. The two flanges and the bottom thus define a housing 36 for receiving the elongated seal 14.

In this example, the seal-carrier 30 is a longitudinal profile 31 that has a "U" section considered in a horizontal plane.

More specifically, in this example, the longitudinal profile 31 includes two "L"-shaped longitudinal elements 31a, 31b. These two longitudinal elements are spaced apart from each other so as to delimit a longitudinal slot 40, this longitudinal slot being formed in the bottom 14 and constituting a mounting part 32 for receiving the seal 14.

In this example, the seal-carrier 30 is fixed, for example by welding, to the reinforcement bars 20a which constitute the first end part 18a of the reinforcement cage 18. In this non-limiting example, the seal 14 is flat and includes two side beads 15a, 15b and a central bead 15c, the side beads and the central bead being parallel and extending along the length of the seal 14.

Figure 2:
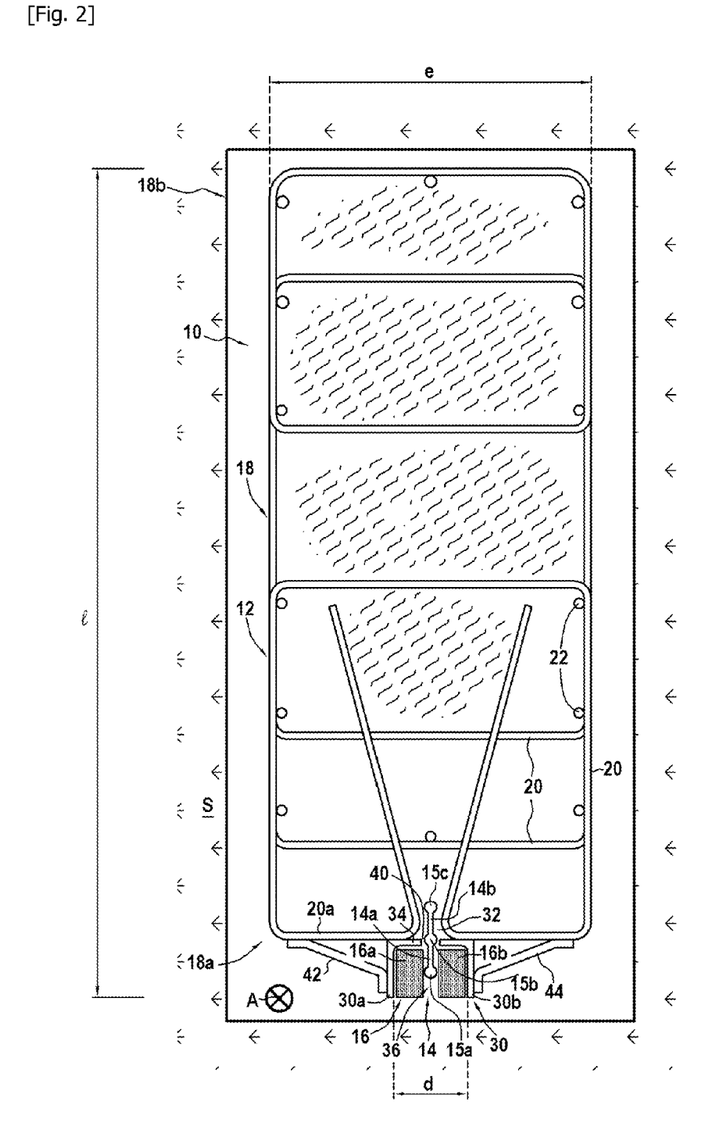
FIG. 2 is a top view of the reinforcement device of FIG. 1.

As can be seen in the example of FIG. 2, the first part of the seal is surrounded by the sacrificial material 16, while its second part 14b extends inside the volume of the reinforcement cage. In other words, the seal extends on either side of the first end part 18a of the reinforcement cage 18. The seal 14 also extends on either side of the bottom 34, perpendicularly to the bottom 34. Considered along the thickness of the reinforcement cage, the span of the sacrificial material is strictly smaller than the thickness e of the reinforcement cage, and moreover smaller than half the width of the reinforcement cage.

To reinforce the holding of the seal-carrier to the reinforcement cage, the reinforcement element 12 further includes reinforcing members 42, 44 that connect the flanges 30a, 30b of the seal-carrier to the reinforcement cage 18. In this example, these are metal rods that are welded to the flanges on the one hand and to the reinforcement cage on the other hand.

Figure 3:
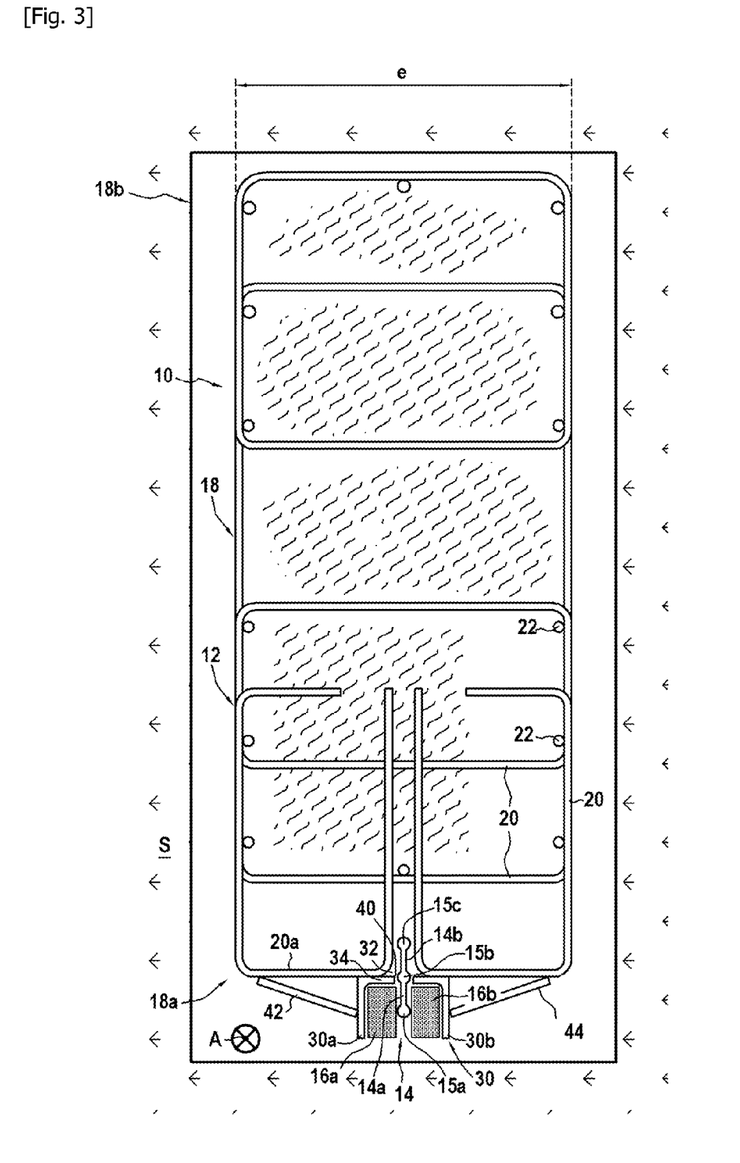
FIG. 3 illustrates a first variant of the reinforcement device of FIG. 2.

FIG. 3 illustrates a first variant of the reinforcement cage of FIG. 2, in which the reinforcement bars have another conformation.

Figure 4:
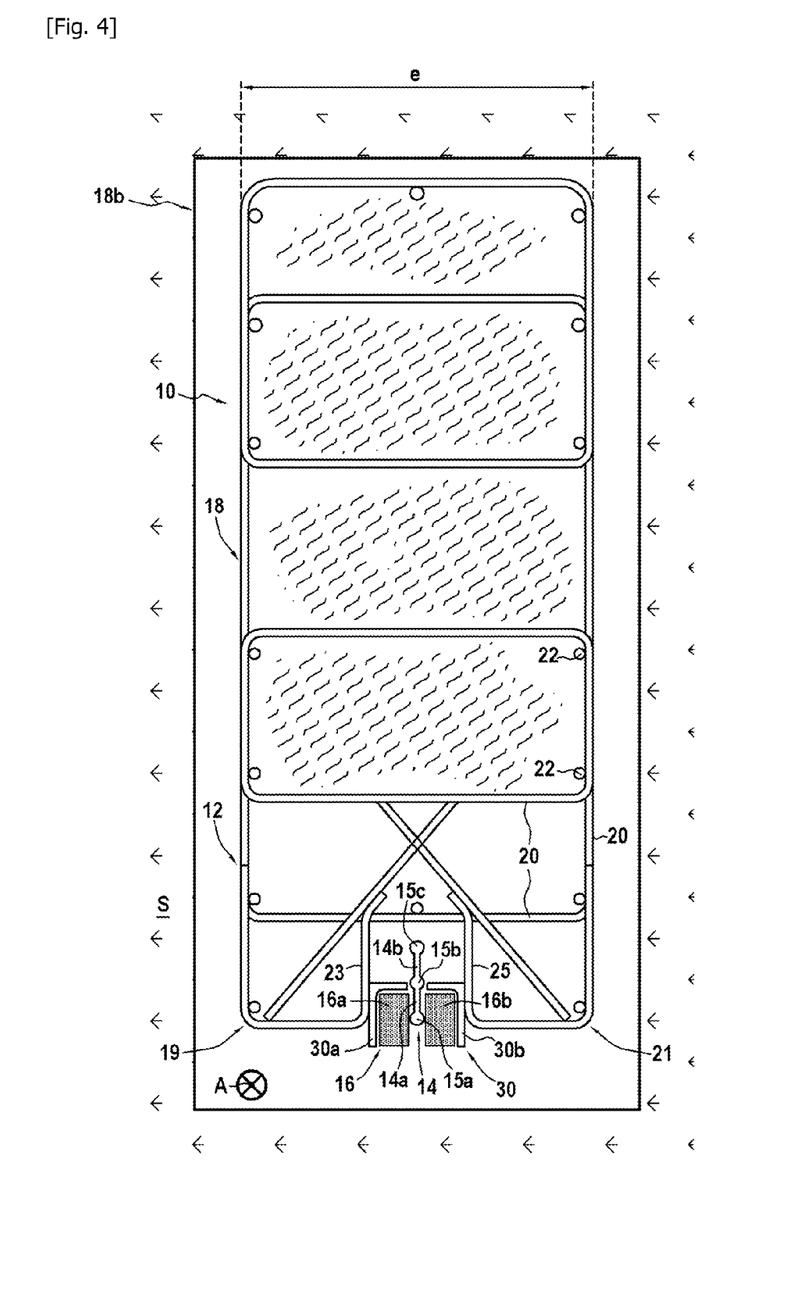
FIG. 4 illustrates a second variant of the reinforcement device of FIG. 2.
Figure 5:
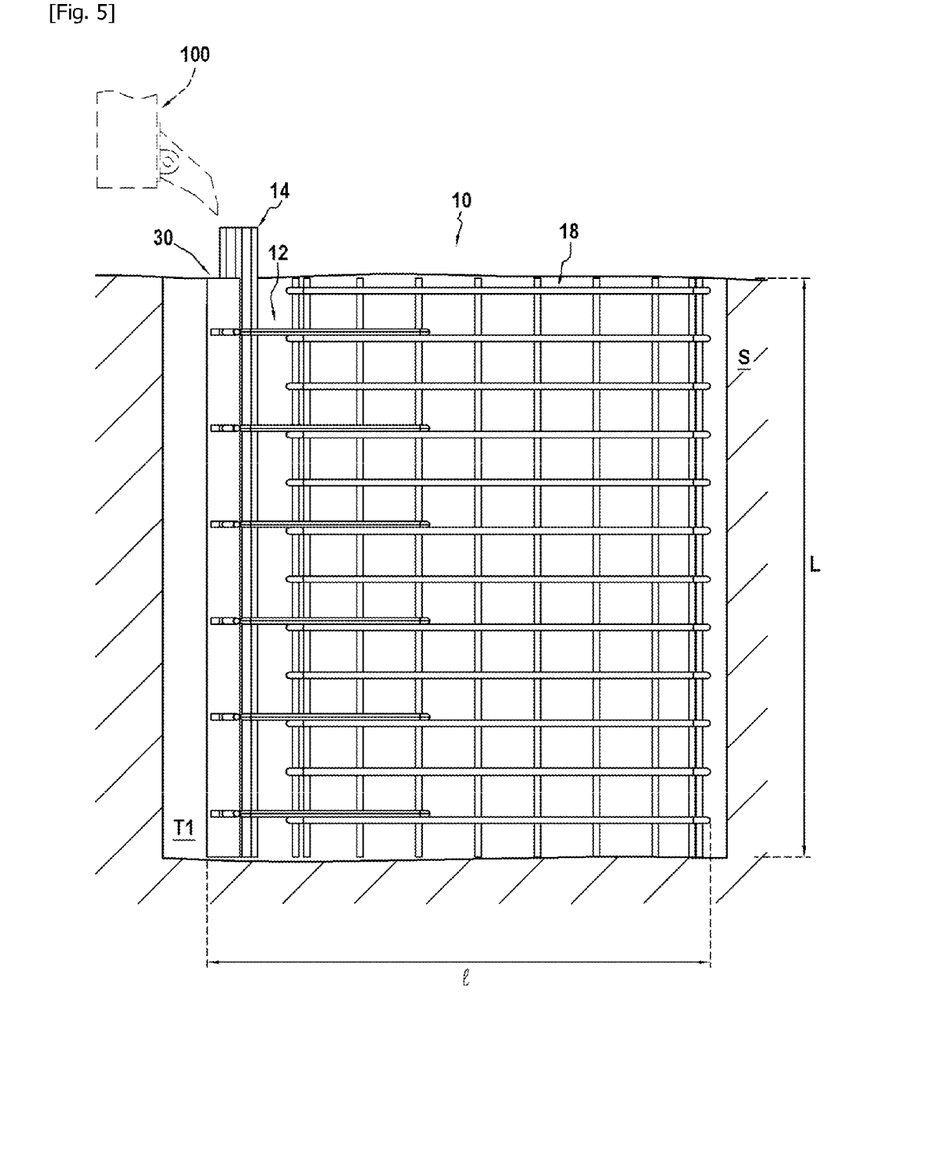
FIG. 5 is a side view of the reinforcement device of FIG. 1.

In the second variant illustrated in FIG. 4, the reinforcement cage 18, considered in a plane perpendicular to the longitudinal direction A, that is to say in a horizontal plane, includes two reinforcement portions 19, 21 which are adjacent and which are each provided with at least two parallel rods 23, 25. As observed in FIG. 4, the seal-carrier is fixed to each of the two adjacent reinforcement parts 19, 21. More specifically, the flanges 30a, 30b of the seal-carrier are fixed to the parallel rods 23, 25. Also, in this embodiment, it is not necessary to provide for reinforcing members. It is observed that in this embodiment, the seal-carrier is engaged in a recess formed in the reinforcement cage 18, this recess being delimited laterally by the parallel rods 23, 25.

It is observed that the first and second parts 14a, 14b of the seal are disposed on either side of the bottom 34 when the seal is mounted on the seal-carrier 30, so that the seal 14 extends transversely relative to the bottom 34, the first part being located in the housing and flanked by the sacrificial material.

In the example of FIG. 4, the seal 14 is disposed within the volume of the reinforcement cage 18.

Preferably, the sacrificial material 16 includes polystyrene. More generally, the sacrificial material is friable. In this example, the sacrificial material 16 includes two blocks 16a, 16b which flank the first part 14a of the seal 14.

Figure 6:
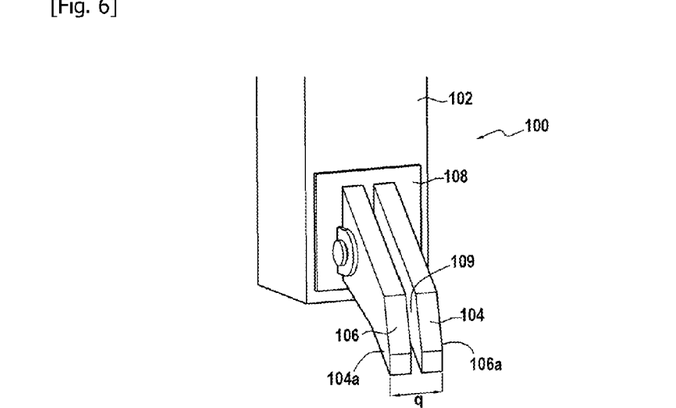
FIG. 6 illustrates one exemplary embodiment of a scraping tool in accordance with the disclosure.

To discharge the sacrificial material 16 out of the housing 36, the disclosure also relates to a scraping tool 100, illustrated in FIG. 6. The scraping tool 100 is fixed to a frame 102 which is vertically movable thanks to suitable means known otherwise and not illustrated here. By way of example, the scraping tool can be fixed on one side of the frame of a drilling tool of the grab bucket type.

The scraping tool 100 includes two teeth 104, 106 which are parallel to each other while being spaced apart from each other so as to define therebetween a passage 109 for the seal 14. The width of the passage 109 is slightly greater than the thickness of the seal.

The width q of the scraping tool, considered between the external edge 104a of the first tooth 104, and the external edge 106a of the second tooth 106, is substantially equal to the distance between the flanges 30a, 30b of the seal-carrier 30. The two teeth 104, 106 are, in this example, fixed to a plate 108 which is itself fixed to the frame 102.

In this non-limiting example, the end of the teeth 104, 106 is beveled so as to facilitate the discharge of the polystyrene out of the housing 36.

A method for making a diaphragm wall in the ground S in accordance with the present disclosure will now be described using FIGS. 7 to 14.

Figure 7:
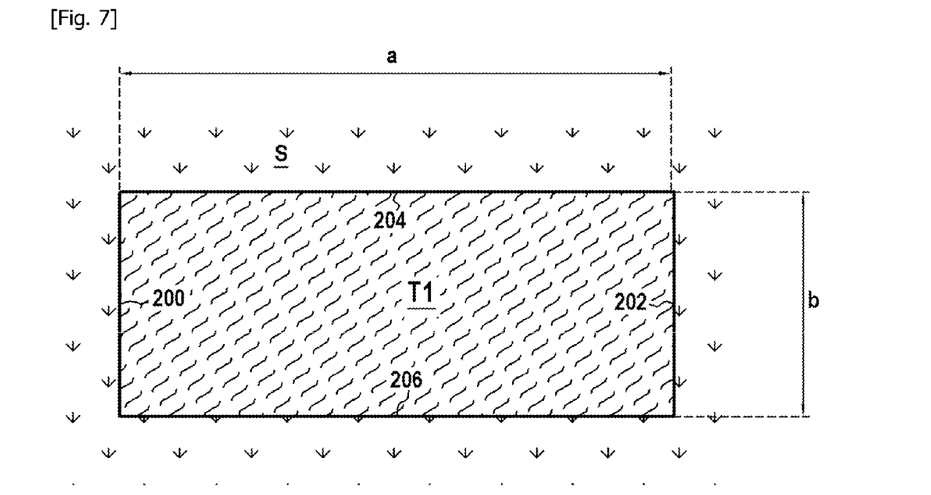
FIG. 7 illustrates a first step of the method for making a diaphragm wall according to the disclosure.

During the first step, illustrated in FIG. 7, a first vertical trench T1 is drilled in the ground S.

Typically, the drilling is carried out while filling the trench with mud in order to prevent the walls of the trench from collapsing. This mud is represented by the wavy lines in FIGS. 4, 7, 8, 11, 12 and 13.

The trench has a length a and a width b. It has first and second vertical walls 200, 202 opposite to each other, and third and fourth vertical walls 204, 206 opposite to each other. In this example, the first and second vertical walls 200, 202 are smaller than the third and fourth vertical walls 204, 206.

Figure 8:
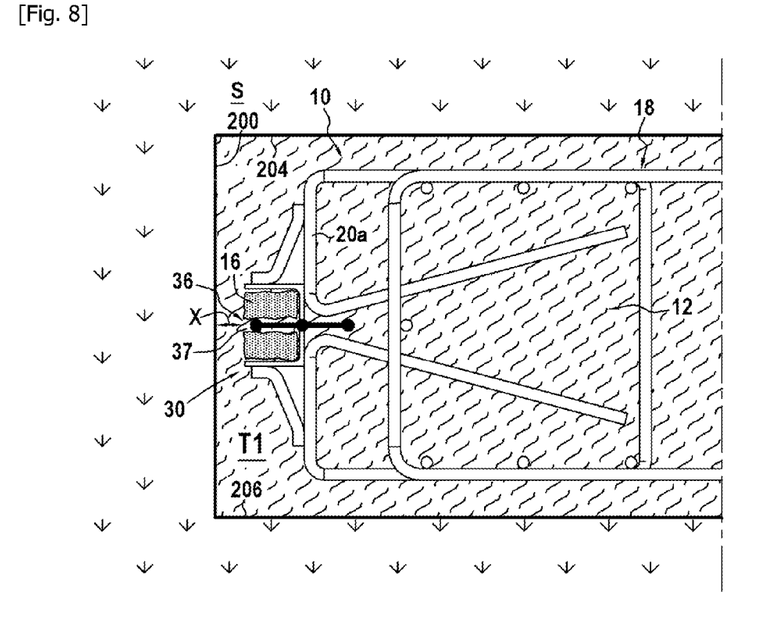
FIG. 8 illustrates a second step of the method for making a diaphragm wall according to the disclosure.

According to a second step, illustrated in FIG. 8, a first reinforcement device 10 according to the disclosure, for example that of the example in FIG. 2, is placed in the first trench T1.

As observed in FIG. 8, the reinforcement device 10 is placed in the trench T1 in such a way that the seal-carrier 30 is opposite the first wall 200. As observed in this example, the first end part of the device 18a of the reinforcements cage 18, constituted by the opening 37 of the housing 36 is spaced apart, considered in a horizontal plane, from the first wall 200 of the trench T1. This distance is referenced X. In practice, this distance X should be as small as possible, if possible equal to or close to zero. In this example, this distance is on the order of 10 cm. Without departing from the scope of the present disclosure, the reinforcement device 10 could be placed in the trench such that the seal-carrier 30 bears against the first wall 200 of the trench T1.

Figure 9:
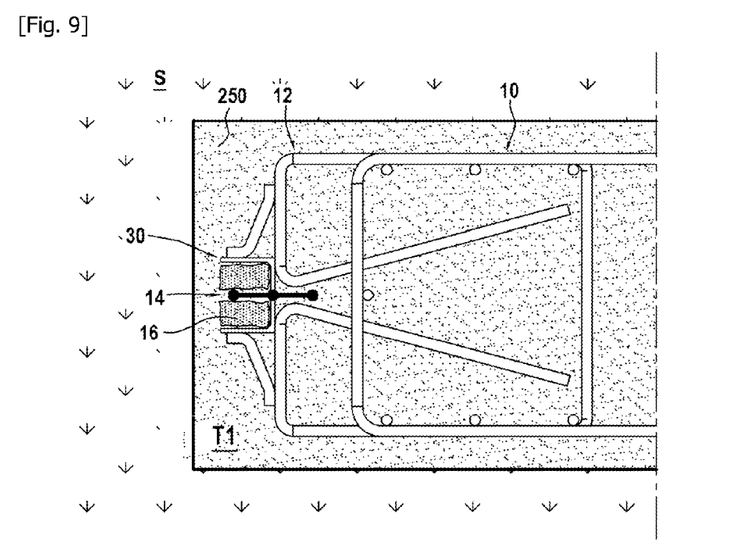
FIG. 9 illustrates a third step of the method for making a diaphragm wall according to the disclosure.

According to a third step, illustrated in FIG. 9, concrete is poured into the trench T1.

Figure 10:
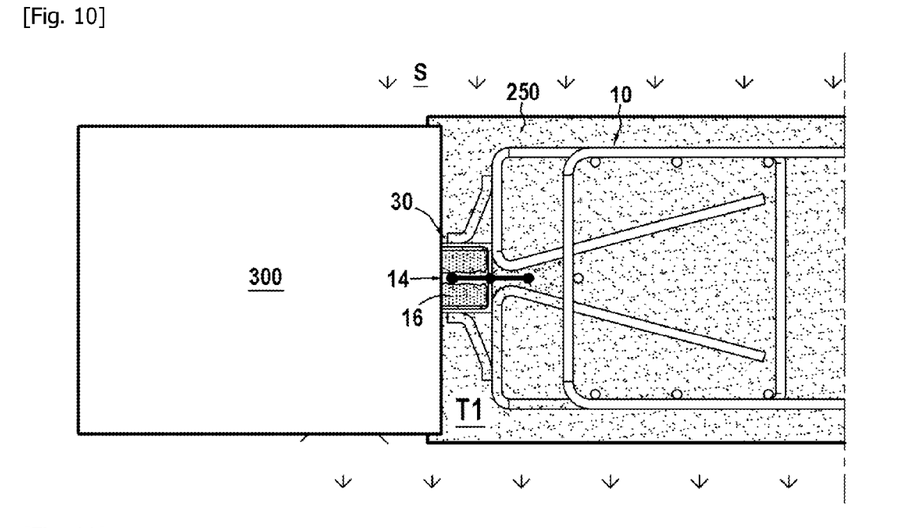
FIG. 10 illustrates a fourth step of the method for making a diaphragm wall according to the disclosure.

According to a fourth step illustrated in FIG. 10, after hardening of the concrete, a second vertical trench T2 is drilled in the ground S, this second trench T2 being juxtaposed with the first vertical trench T1 on the side of the seal-carrier 30. As illustrated in FIG. 10, the drilling is carried out using a drilling tool schematized by the reference 300, the drilling tool 300 being placed as close as possible to the seal-carrier 30.

Figure 11:
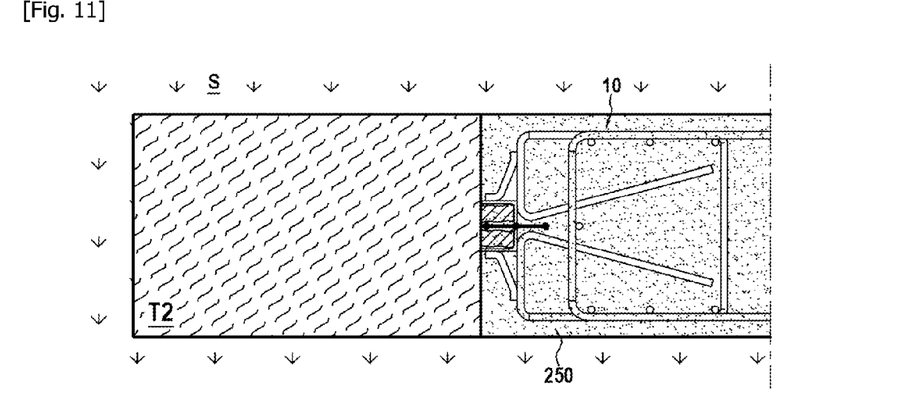
FIG. 11 illustrates the first panel and the second trench, at the end of the fourth step.

FIG. 11 illustrates the first panel 250 obtained after hardening of the concrete in the first trench T1, and overlapped on part of its length in order to reach the seal-carrier 30 or at the very least to minimize the thickness of residual concrete between the seal-carrier and the second trench T2. The result is illustrated in FIG. 11. In this example, the sacrificial material 16 comes into contact with the mud of the second trench T2.

Figure 12:
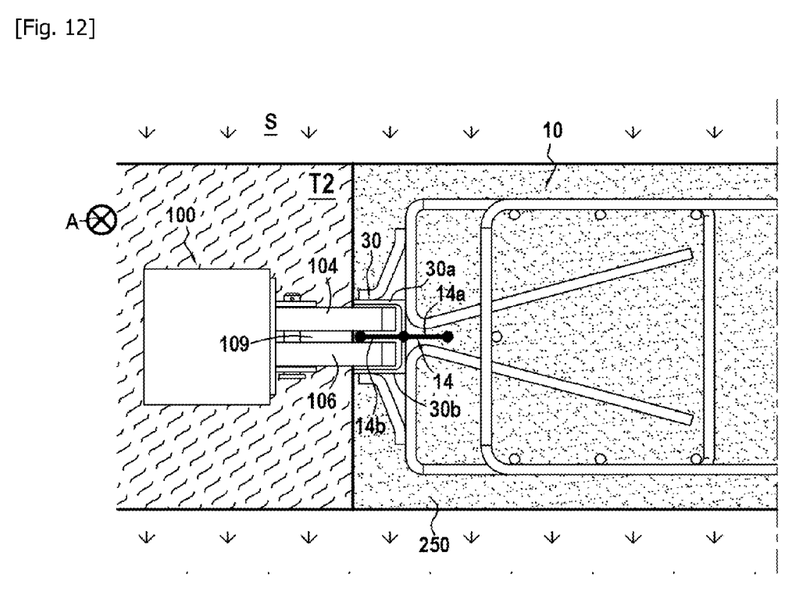
FIG. 12 illustrates a sixth step of the method for making a diaphragm wall according to the disclosure.
Figure 13:
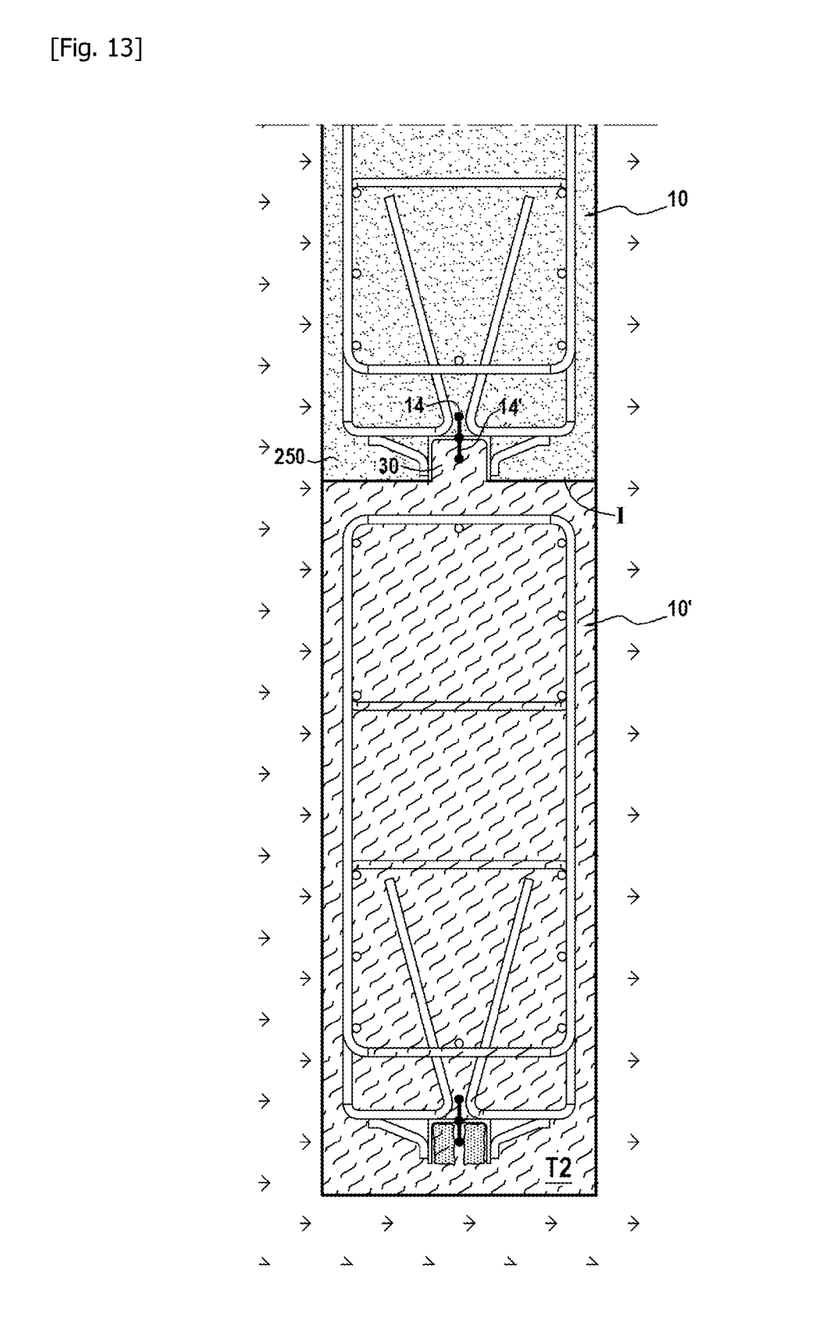
FIG. 13 illustrates a seventh step of the method for making a diaphragm wall according to the disclosure.

Using the scraping tool 100 previously described, the sacrificial material is discharged out of the housing 30. To do so, the scraping tool 100 is engaged in the housing at the top of the seal-carrier 30 such that the seal 14 is disposed in the passage 109 located between the teeth 104, 106. As observed in FIG. 12, illustrating the step of discharging the sacrificial material, each of the teeth 104, 106 is located between the first part 14a of the seal and either of the flanges 30a, 30b of the seal-carrier 30, so as to be engaged in the volume occupied by the sacrificial material. It is understood that the descent along the vertical axis Z of the scraping tool 100 has the effect of discharging the sacrificial material towards the second trench T2.

After the discharge of the sacrificial material, it is understood that the housing is open in the second trench T2 so that the mud fills the housing. The first part 14a of the seal 14 is then surrounded by mud.

Figure 14:
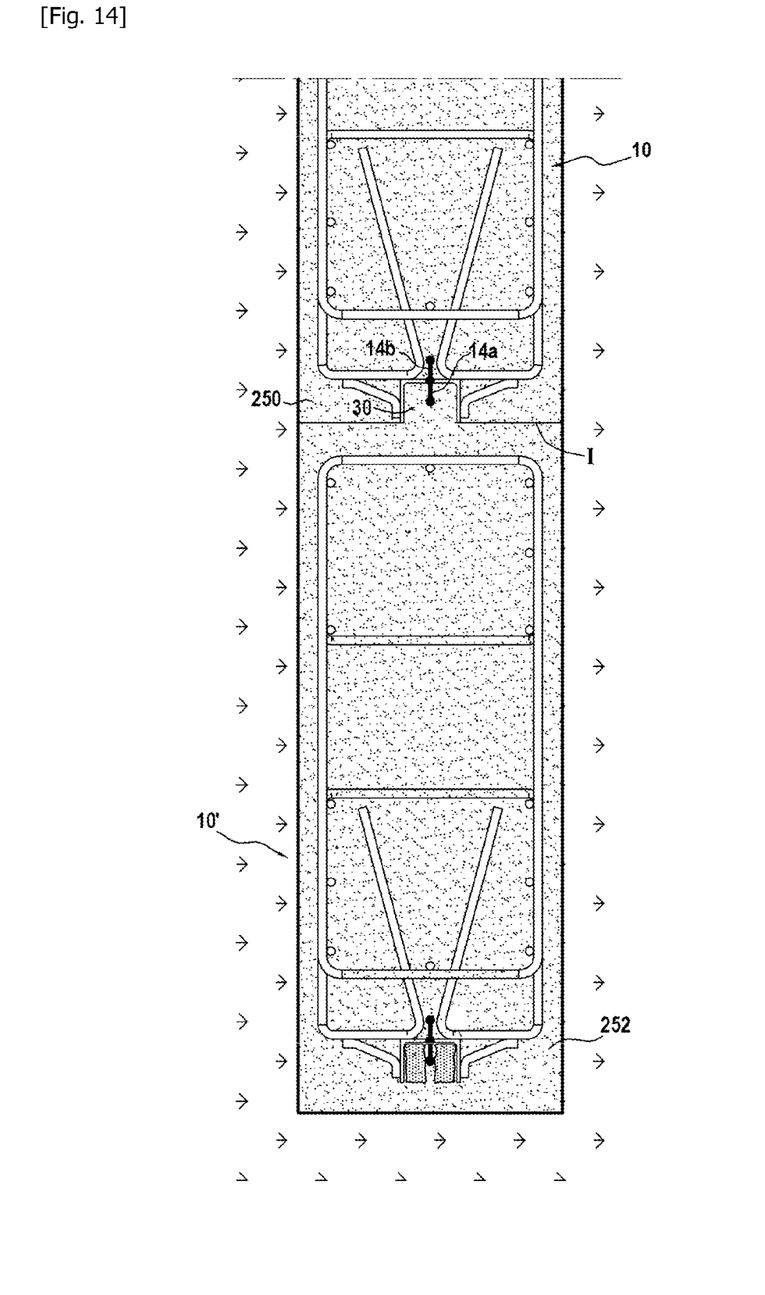
FIG. 14 illustrates an eighth step of the method for making a diaphragm wall according to the disclosure.

Then, in a following step, illustrated in FIG. 14, a second reinforcement device 10' is placed, then concrete is put in the second trench T2 so as to obtain, after hardening, the second panel 252.

It will be understood that when the concrete is put in the second trench, the concrete fills the housing 30 of the first reinforcement device 10, so that after hardening, the first part 14a of the seal 14 is engaged with the concrete of the second panel. The seal 14, engaged with the concrete of the first and second panels 250, 252, thus achieves a sealing between the two panels.

The invention claimed is:

1. A reinforcement element for a diaphragm wall including a reinforcement cage having a height defining a longitudinal direction, a width and a thickness, the reinforcement cage having a first end part and a second end part opposite to the first end part along the width, the first and second end parts extending along the longitudinal direction of the reinforcement cage, the reinforcement element further including at least one seal-carrier provided with a mounting part for receiving at least one seal that is elongated, the at least one seal-carrier being fixed to the first end part of the reinforcement cage and extending along the longitudinal direction of the reinforcement cage, the at least one seal-carrier having two flanges extending along the longitudinal direction and a bottom defining a housing for receiving the at least one seal, at least a first part of the at least one seal being surrounded by a sacrificial material, the mounting part including a longitudinal slot formed in the bottom of the seal-carrier to receive the at least one seal.

2. The reinforcement element according to claim 1, wherein the at least one seal-carrier has a longitudinal profile.

3. The reinforcement element according to claim 2, wherein the longitudinal profile has a U-shaped section.

4. The reinforcement element according to claim 2, wherein the longitudinal profile includes two L-shaped longitudinal elements.

5. The reinforcement element according to claim 1, further including reinforcing members connecting at least one of the flanges to the reinforcement cage.

6. The reinforcement element according to claim 1, wherein the reinforcement cage, in a plane perpendicular to the longitudinal direction, includes two adjacent reinforcement portions each provided with at least two parallel reinforcements, the at least one seal-carrier being fixed to each of the two adjacent reinforcement portions.

7. A reinforcement device including:
at least one seal;
a reinforcement element for a diaphragm wall including a reinforcement cage which has a height defining a longitudinal direction, a width and a thickness, the reinforcement cage having a first end part and a second end part opposite to the first end part along the width of the reinforcement cage, the first and second end parts extending along the longitudinal direction of the reinforcement cage, the reinforcement element further including at least one seal-carrier provided with a mounting part for receiving the at least one seal which is elongated, the at least one seal-carrier being fixed to the first end part of the reinforcement cage and extending along the longitudinal direction of the reinforcement cage, the at least one seal-carrier having two flanges extending along the longitudinal direction and a bottom so as to define a housing for receiving the at least one seal, the mounting part including a longitudinal slot formed in the bottom of the seal-carrier to receive the at least one seal; and
a sacrificial material arranged in the housing defined by the two flanges and the bottom of the at least one seal-carrier, the at least one seal being mounted on the at least one seal-carrier while being at least partly bordered by the sacrificial material.

8. The reinforcement device according to claim 7, wherein the at least one seal further has a second part, the first and second parts being disposed on either side of the bottom of the at least one seal-carrier when the at least one seal is mounted on the at least one seal-carrier, so that the at least one seal extends transversely relative to the bottom, the first part being located in the housing and flanked by the sacrificial material.

9. The reinforcement device according to claim 7, wherein the sacrificial material comprises polystyrene.

10. A method for making a diaphragm wall in the ground, comprising:
drilling a first vertical trench in the ground;
placing in the first trench a reinforcement element for the diaphragm wall including a reinforcement cage having a height defining a longitudinal direction, a width and a thickness, the reinforcement cage having a first end part and a second end part opposite to the first end part, along the width of the reinforcement cage, the first and second end parts extending along the longitudinal direction of the reinforcement cage, the reinforcement element further including at least one seal-carrier provided with a mounting part for receiving at least one seal which is elongated, the at least one seal-carrier being fixed to the first end part of the reinforcement cage and extending along the longitudinal direction of the reinforcement cage, the at least one seal-carrier having two flanges extending along the longitudinal direction and a bottom so as to define a housing for receiving the at least one seal, at least a first part of the at least one seal being surrounded by a sacrificial material, the mounting part including a longitudinal slot formed in the bottom of the at least one seal-carrier to receive the at least one seal;

pouring concrete into the first trench then, after hardening of the concrete, drilling a second vertical trench in the ground, juxtaposed with the first vertical trench on a side of the at least one seal-carrier;

discharging the sacrificial material out of the housing using a scraping tool including two parallel teeth spaced apart from each other so as to define a passage for the at least one seal, the width of the scraping tool being substantially equal to a distance between the flanges of the at least one seal-carrier, so that the first part of the at least one seal extends into the second trench; and putting concrete in the second trench.

\* \* \* \* \*